United States Patent [19]

Swagerty

[11] Patent Number: 4,958,594

[45] Date of Patent: Sep. 25, 1990

[54] MODULAR TACK ROOM

[75] Inventor: Billy H. Swagerty, Eugene, Oreg.

[73] Assignees: Carl E. O'Bryant; Linda K. O'Bryant, both of Veneta, Oreg.

[21] Appl. No.: 453,701

[22] Filed: Dec. 20, 1989

[51] Int. Cl.$^5$ .......................... A01K 29/00; B60P 3/04
[52] U.S. Cl. ............................................. 119/7; 119/10; 296/24.2; 248/215; 248/243; 211/88; 211/103
[58] Field of Search .......................... 119/7, 10, 27; 296/24.2; 248/215, 214, 224.2, 225.2, 243, 315; 211/88, 90, 13, 103, 187, 190, 208

[56] References Cited

U.S. PATENT DOCUMENTS

| | | | |
|---|---|---|---|
| 2,809,755 | 10/1957 | Martorello | 119/15 |
| 3,631,821 | 1/1972 | Zachariou | 248/243 |
| 3,664,626 | 5/1972 | Sueller | 248/214 |
| 3,730,467 | 5/1973 | Dutchburn | 248/243 |
| 3,780,971 | 12/1973 | DeFilipps | 248/214 |
| 4,086,858 | 5/1978 | Howitt | 248/243 |
| 4,138,019 | 2/1979 | Smith | 248/214 |
| 4,159,142 | 6/1979 | Larson | 119/20 |
| 4,411,400 | 10/1983 | Everett | 248/243 |
| 4,709,891 | 12/1987 | Barnett | 248/214 |

FOREIGN PATENT DOCUMENTS 3224497 12/1983 Fed. Rep. of Germany .......... 119/7

*Primary Examiner*—John Weiss
*Attorney, Agent, or Firm*—John F. Ingman

[57] ABSTRACT

A modular tack room which includes at least one wall hanger assembly and one or more hanging components. The wall hanger assembly includes an elongated vertical member which adjustably hooks over and grips the wall of a horse stall or trailer, and which has a plurality of receiving clips spaced along its length. A common mounting for a variety of hanging components includes a vertical mounting plate which fits downward within the receiving clip; two guide members, horizontally extending from the mounting plate, which are laterally separated by a space slightly greater than the width of the vertical tube to embrace the sides of the vertical member; and a lower support member positioned below the mounting plate to provide support against the vertical member. Various hanging components include: a saddle rack; a saddle rack having a bridle-harness hanger at its outer end; an arm member which extends horizontally, and, when used in pairs, provides support for a shelf; an extended arm member which, when used with a notched diagonal brace engaging the next lower receiving clip, provides a wider platform which may be used as a bunk; an arm member additionally having, at its outer end, an aperture through which a rod may be inserted, so that, used in pairs, it provides support for a horizontal rod; a multiple saddle blanket arm having a number of spaced apertures, which, when used in pairs with horizontal rods therebetween, supports multiple saddle blankets; and a bucket holder which includes a horizontal circular rim to hold a bucket for water or grain.

11 Claims, 5 Drawing Sheets

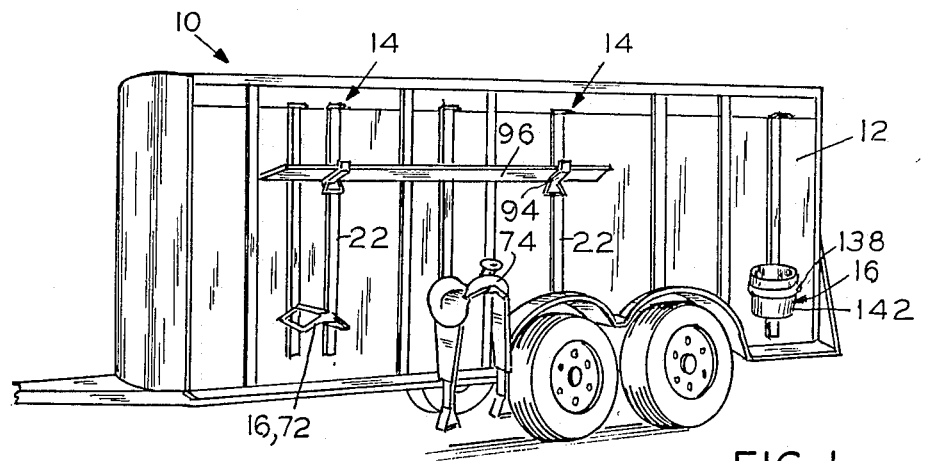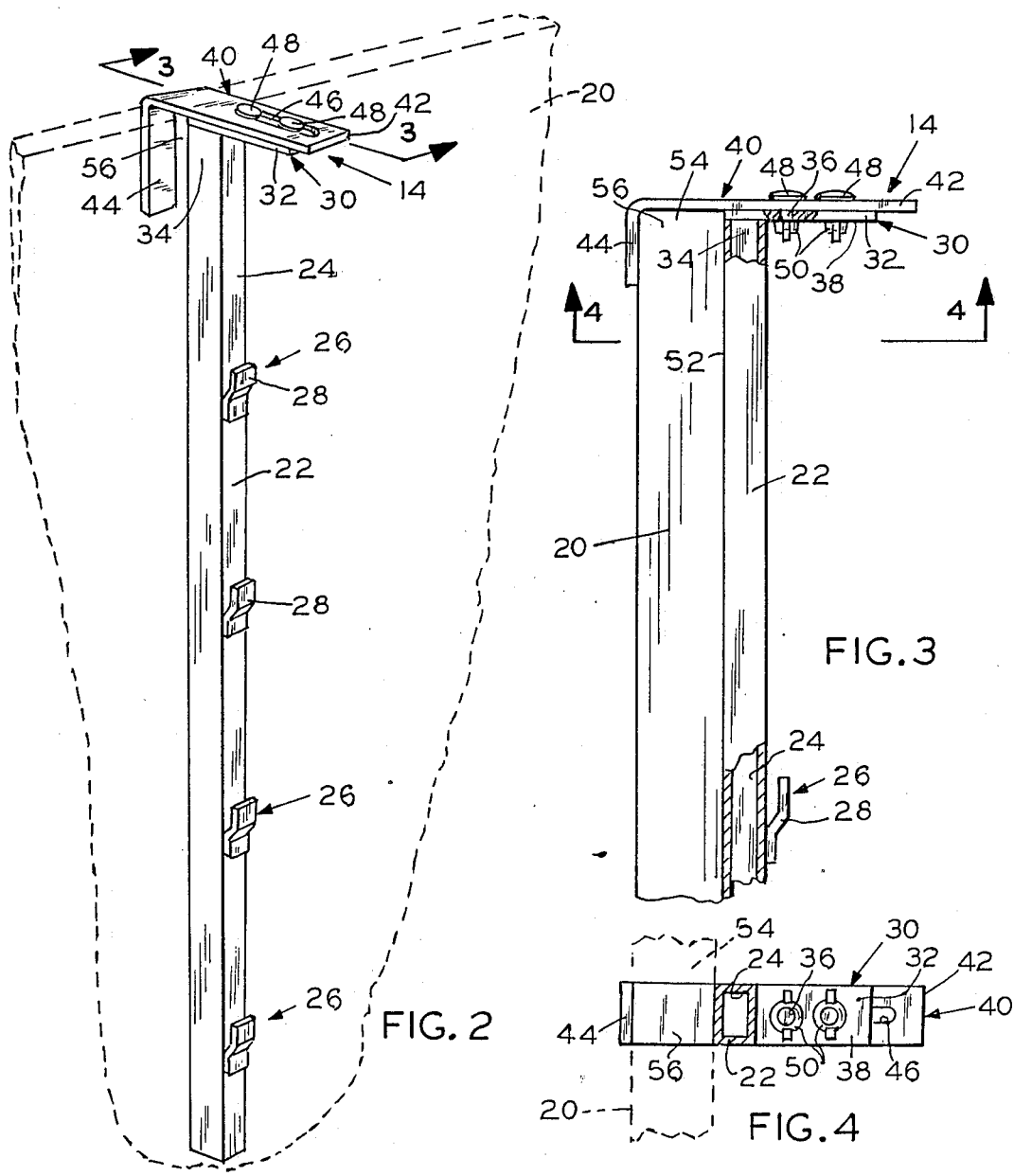

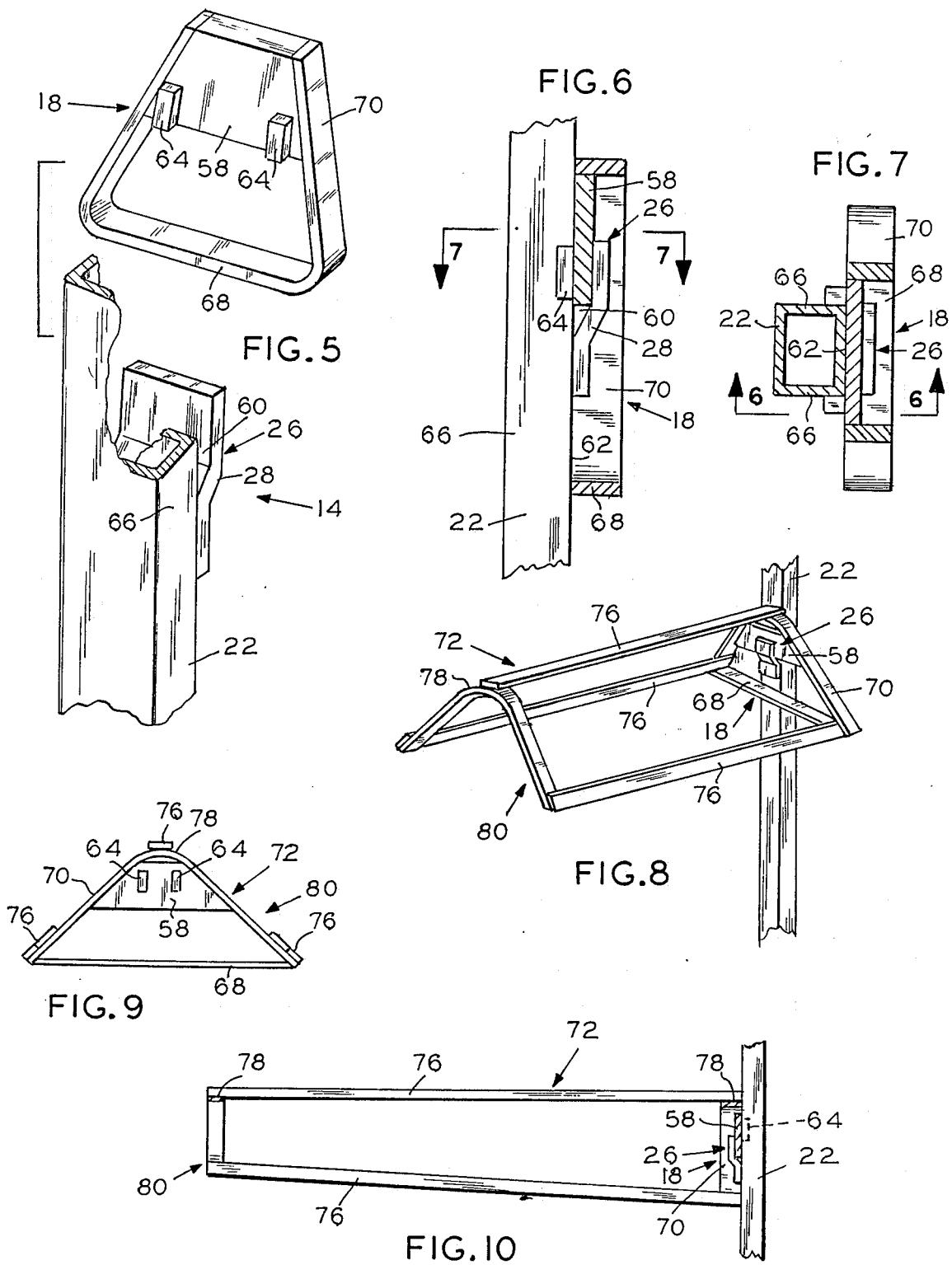

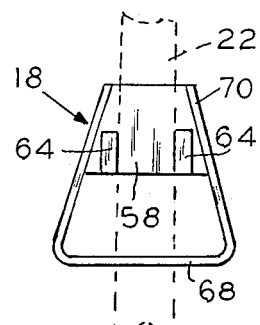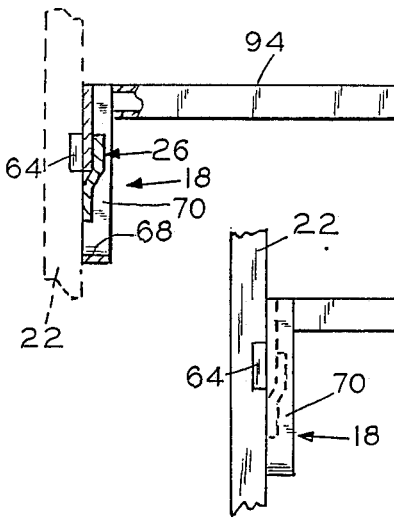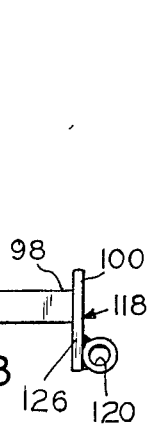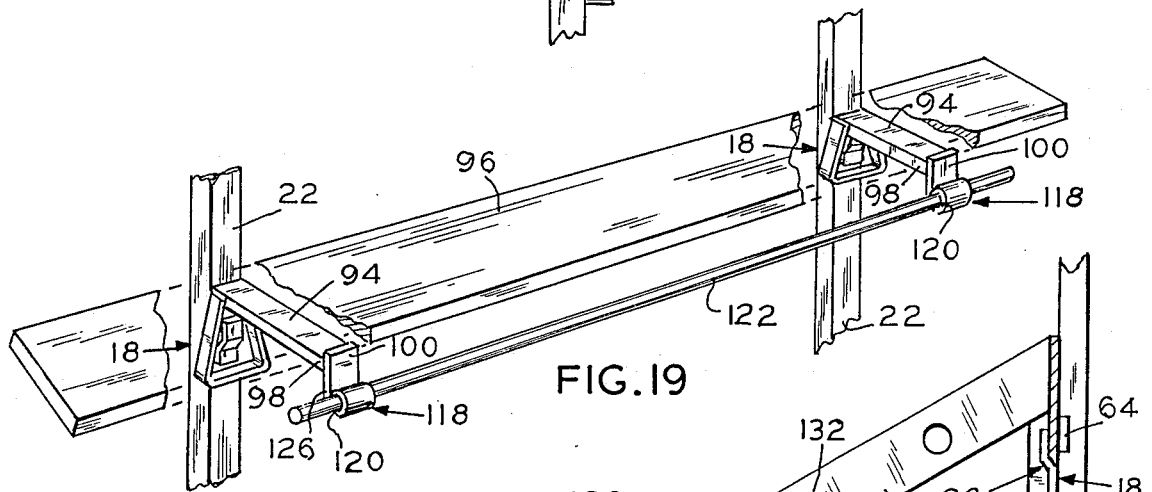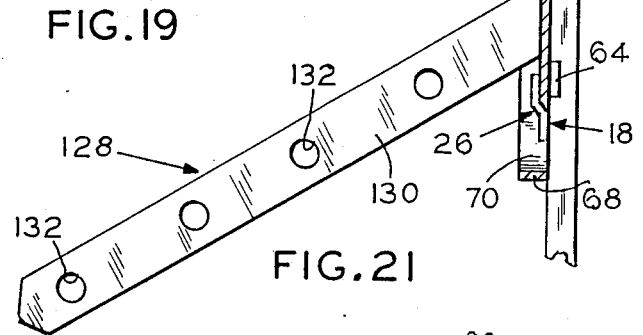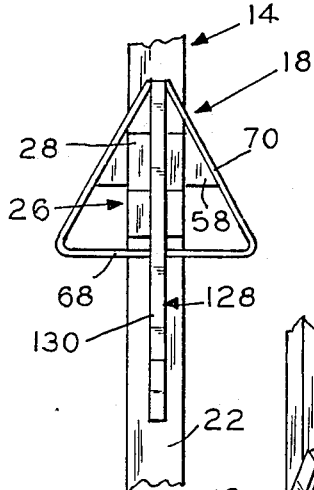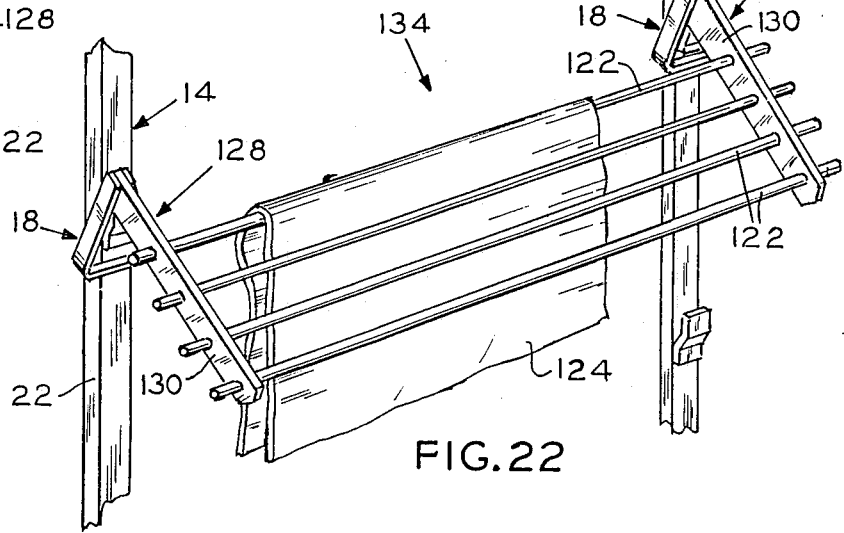

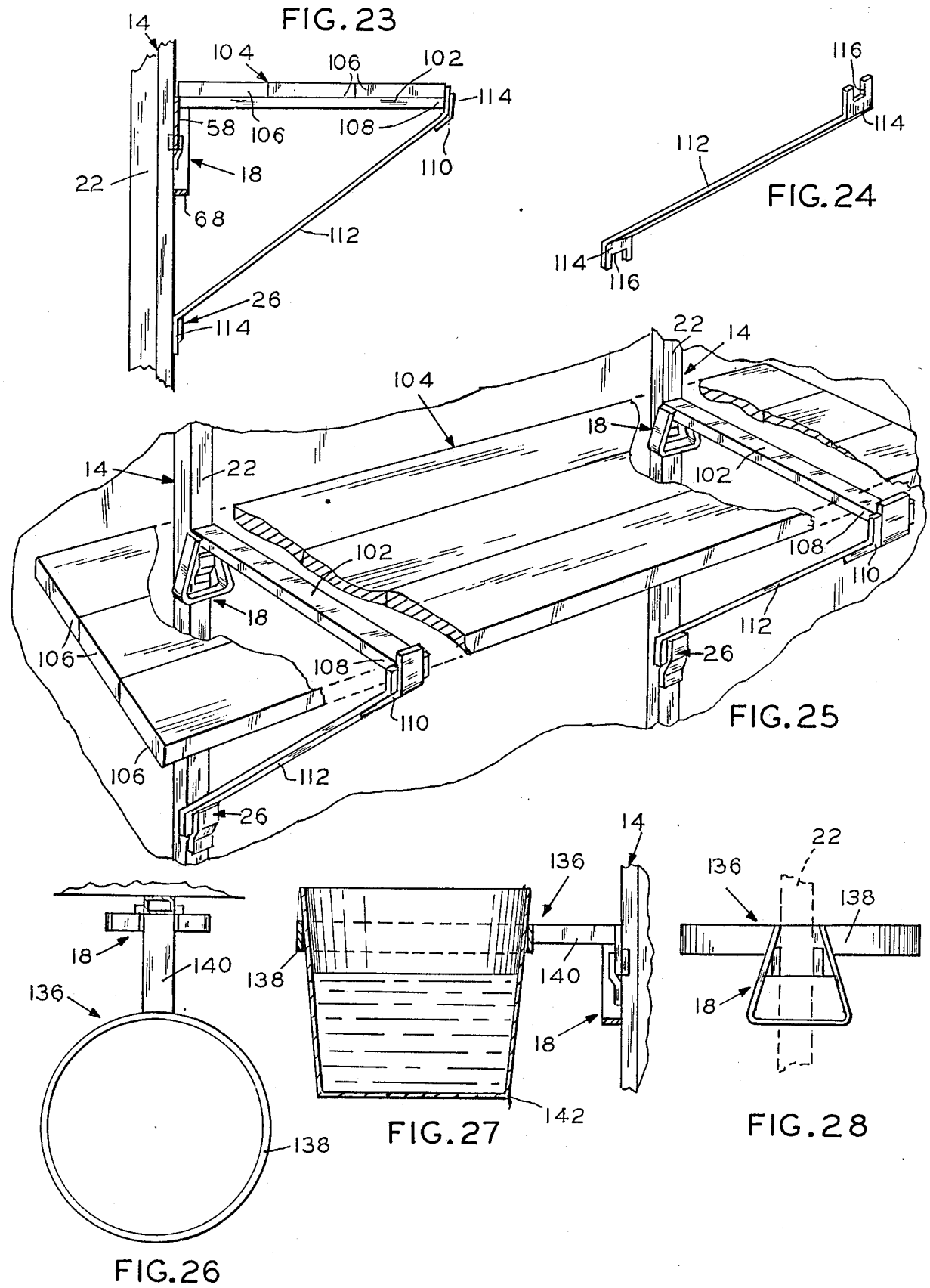

MODULAR TACK ROOM

BACKGROUND OF THE INVENTION

1. Field of the Invention

This invention involves tack room equipment and, more particularly, a system of tack room equipment consisting of modular components which may be assembled and disassembled as needed.

2. Description of the Prior Art

When traveling to show horses, there normally is, during transport and at destination, insufficient space and no arrangements for the storage of horse-related gear such as saddles, saddle blankets, bridles, halters and grooming paraphernalia. Generally, this means the stacking of gear on the floor of a horse trailer or a stall, such procedure being incompatible with the normal care of fine and costly gear.

Since both the storage space available and its configuration will vary from trailer to trailer and from place to place, as will the type and quantity of horse-related gear which is required, what is needed is a modular tack room, that is, a system of tack room equipment in the form of modular components, which may be easily assembled and disassembled in the desired form, as required.

SUMMARY OF THE INVENTION

The present invention provides a modular tack room which meets the aforementioned need. A system of tack room equipment is provided in the form of modular components which may be combined and used as desired.

Accordingly, the modular tack room, in its preferred embodiment, is comprised of one or more wall hanger assemblies and one or more hanging components, as described subsequently.

The preferred wall hanger assembly includes an elongated vertical member, in the form of a vertical tube of various lengths, which adjustably hooks over the wall of a horse stall or horse trailer and has a plurality of receiving clips spaced approximately 16-inches apart along its length. The means of adjustable hooking atop the stall or trailer wall includes a horizontal plate permanently attached to the top, and extending forward, of the vertical tube, to which is adjustably connected an L-shaped hanging member, thereby forming a clamp-type arrangement, between the L-shaped hanging member and the vertical tube, which grips the upper portion of the stall or trailer wall. The receiving clips are L-shaped members, having substantially the width of the vertical tube, which are attached to the tube at their lower ends and extend upwardly, closely parallel to the tube.

A variety of hanging components may be attached to the receiving clips of the wall hanger assembly. Such hanging components have the following common means of mounting:

a. A mounting plate of such thickness so as to fit downward between an upwardly extending receiving clip of the vertical tube and the vertical tube itself;

b. Two guide members, horizontally extending from the mounting plate, which are laterally separated from each other by a space slightly greater than the width of the vertical tube, so that they guide the insertion of the mounting plate into the receiving clip space, and, once inserted, the guide members embrace the sides of the vertical tube so as to limit lateral and rotational movement of the hanging component; and c. A lower support member positioned below the mounting plate so as to contact the vertical tube and thus provide support against the rotational component of the levered weight of the hanging component and its load.

Hanging components, utilizing said common mounting means, include:

A saddle rack, which extends horizontally outwards from the mounting means, having at least three extending members to form a supporting framework of generally triangular cross section upon which a saddle may be placed for storage. An alternative configuration of the saddle rack may additionally have a bridle-harness hanger at its outer end which includes a concavely downward curved plate covering an upwardly-pointed hook member, whereat harness or bridle gear may be laid over the curved plate or within the hook member for storage.

A projecting arm member which extends horizontally outwards from the mounting means. While such arm member may be utilized by itself to hang gear, it is preferably employed in conjunction with another arm member attached to a second, spaced, wall hanger assembly, so as to provide support for a shelf placed on and extending therebetween. Such shelving may be used for storing grooming equipment and other items. Preferably, the arm member has, at its outer end, an upwardly extending lip to preclude outward sliding of the shelfs. A preferred outward length of such arm member is approximately 12-inches.

An alternative, extended arm member which attaches to the wall hanger assembly by the described mounting means but extends outwardly approximately 35-inches to accommodate shelving of greater total width, so as to provide, in conjunction with a second extended arm member attached to a second, spaced, wall hanger assembly, a platform which may be used, for example, as a bunk or bed. The outer end of such extended arm member additionally may have an inwardly and downwardly directed member which engages a notched diagonal brace member, the diagonal brace member extending between the outer end of the extended arm member and engaging into the next lower receiving clip below, so as to provide additional bracing for the levered load on the extended arm member.

An arm member additionally may have attached, proximate to its outer end, a horizontal aperture through which a horizontal rod ay be inserted. Using two spaced wall hanger assemblies and arm members with the horizontal aperture, the supported rod may be used to hang saddle blankets or personal clothing.

A multiple saddle blanket arm which includes a bar which extends outwardly and downwardly from the mounting means and which has a number of spaced apertures formed therein. When used in conjunction with a second multiple saddle blanket arm attached to a second, spaced, wall hanger assembly, where horizontal rods have been inserted in corresponding apertures within the two multiple saddle blanket arms, there is formed a saddle blanket holder capable of supporting, for drying and storage, multiple saddle blankets.

A bucket holder which includes a horizontal circular member which may be attached to a short horizontal extension from the mounting means. The bucket holder, preferably approximately 12-inches in diameter, is used to hold a conventional tapered bucket for water or grain for the animals. Such bucket holder normally would be attached to a wall hanger assembly at a lower receiving clip.

As indicated above, the modular tack room is portable, composed of modular components, allowing easy assembly and disassembly, and utilizes, in conjunction with one or more wall hanger assemblies, one or more of the hanging components.

BRIEF DESCRIPTION OF THE DRAWINGS

FIG. 1 illustrates a modular tack room as installed on the exterior of a horse trailer.

FIG. 2 illustrates a perspective view of a wall hanger assembly,

FIG. 3 illustrates a partial sectional side view of the wall hanger assembly, as seen at line 3—3 of FIG. 2.

FIG. 4 illustrates a sectional bottom view of the wall hanger assembly, as seen at line 4—4 of FIG. 3.

FIG. 5 illustrates the mounting means of a hanging component of the modular tack room, together with a section of the wall hanger assembly to which it attaches.

FIG. 6 illustrates a sectional side view of the mounting means attached to section of a wall hanger assembly, as seen at line 6—6 of FIG. 7.

FIG. 7 illustrates a sectional bottom view of the mounting means attached to a wall hanger assembly, as seen at line 7—7 of FIG. 6.

FIG. 8 illustrates a perspective view of a saddle rack hanging component.

FIG. 9 illustrates an inner end view of the saddle rack of FIG. 8.

FIG. 10 illustrates a sectional side view of the saddle rack of FIG. 8.

FIG. 16 illustrates an inner end view of an arm member hanging component.

FIG. 17 illustrates a partially sectioned side view of an arm member hanging component.

FIG. 18 illustrates a side view of the arm member hanging component with rod aperture member attached.

FIG. 19 illustrates a perspective view of the arm member of FIG. 18, in use with a second arm member, supporting a shelf and a horizontal rod.

FIG. 20 illustrates an outer end view of the multiple saddle blanket arm hanging component.

FIG. 21 illustrates a side view of the multiple saddle blanket arm hanging component.

FIG. 22 illustrates a perspective view of the multiple saddle blanket arm of FIGS. 20 and 21, in use with a second multiple saddle blanket arm, supporting a plurality of horizontal rods.

FIG. 23 illustrates a partially sectioned side view of an extended arm member hanging component.

FIG. 24 illustrates the notched diagonal brace utilized with the extended arm member of FIG. 23.

FIG. 25 illustrates a perspective view of the extended arm member of FIG. 23, in use with a second extended arm member, supporting a wide platform.

FIG. 26 illustrates a top plan view of a bucket holder hanging component.

FIG. 27 illustrates a partially sectioned side view of the bucket holder of FIG. 26, with bucket inserted.

FIG. 28 illustrates an inner end view of the bucket holder of FIG. 26.

DESCRIPTION OF THE PREFERRED EMBODIMENT

Figure 11:
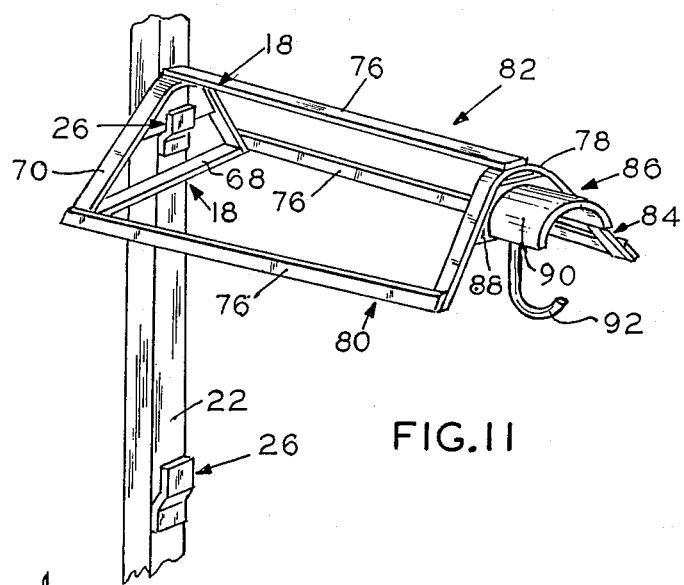
FIG. 11 illustrates a perspective view of a saddle rack hanging component with a bridle-harness hanger attached.

The modular tack room includes a system of tack room equipment in the form of modular components which may be easily combined and used as desired. Utilization of the modular tack room will normally be associated with a horse trailer, both inside and outside, and with a horse stall, as in a stable, where it is used for the storage of horse-related gear such as saddles, saddle blankets, bridles, halters and grooming paraphernalia.

Turning now to the drawings, there is shown in FIG. 1 a horse trailer 12 upon the exterior of which a modular tack room 10 has been installed. The modular tack room 10 is comprised of one or more wall hanger assemblies 14 and one or more hanging components 16 which are attached to a wall hanging assembly 14 by the described mounting means 18. In the modular tack room 10 illustrated in FIG. 1, two saddle racks 72, one with a saddle 74, a shelf 96 for equipment and horse-grooming gear, and a bucket 142 for grain or water are shown suspended on the exterior of the trailer 12. Similar modular tack room 10 installation can be made within the trailer 12, or upon a stall wall 20 within a stable.

The preferred wall hanger assembly 14, as best seen in FIGS. 2 through 4, includes an elongated vertical member 22, preferably in the form of a square tube 24, which adjustably hooks over the wall 20 of a horse stall or horse trailer. The vertical member 22 has a plurality of receiving clips 26 spaced along its length, preferably approximately 16-inches apart. The receiving clips 26 are L-shaped members 28, of substantially the same width as the vertical member 22, which receiving clips 26 extend upwards, closely parallel to the vertical member 22. The vertical member 22 illustrated in FIG. 2 has four receiving clips 26. Various lengths of vertical members 22 with corresponding numbers of receiving clips 26 may be used, depending on the need. Lengths of vertical member 22 varying from three feet with two receiving clips 26 up to seven feet with five receiving clips 26 have been found useful. A preferred vertical member 22 is a square steel tube 24 with 1/16-inch walls, a width of 1½ inches and a depth of 1-inch.

A horizontal member 30, preferably in the form of a 4½×1×¼ inch steel horizontal plate 32, is permanently attached, as by welding, to the top 34 of the vertical member 22 and extends forward therefrom. One or more connecting apertures 36 are formed in the forward extending portion 38 of the horizontal member 30. An L-shaped member 40, having a horizontal leg 42 and a vertical leg 44 is adjustably attached by its horizontal leg 42 against the horizontal member 30 atop the vertical member 22, utilizing an elongated slot 46 formed in the horizontal leg 42 and two bolts 48 and wing-nuts 50, as illustrated. With the vertical leg 44 of the L-shaped member 40 extending downwards parallel to the back 52 of the vertical member 22, a clamp-type arrangement is formed between the L-shaped member 40 and the back 52 of the vertical member 22 so as to grip the upper portion 54 of the wall 20 and allow the vertical member 22, with receiving clips 26, to hang therefrom. The connection between the horizontal member 30 atop the vertical member 22 and the horizontal leg 42 of the L-shaped member 40 is longitudinally adjustable, such adjustment permitting variation of the space 56 between the vertical leg 44 and the vertical member 22 itself, so as to allow a close clamping of the wall hanger assembly 14 to the wall 20. The preferred L-shaped member 40 is constructed of 174-inch steel of 1½-inch width and has a 2½-inch vertical leg 44 and an 8-inch horizontal leg 42, which, with a 5-inch adjusting slot 46, allows the clamping space 56 to vary from 0 to 3¼-inches.

A variety of hanging components 16, having individual capabilities for the storage of horse-related gear, may be designed to be suspended from one or more wall hanging assemblies 14. These hanging components 16 are described below. Common to each hanging component 16 of this invention, for suspension from a wall hanger assembly 14, are mounting means 18 which include: a vertical mounting plate 58 of less thickness than the space 60 between the receiving clip 26 and the front of the vertical member 22, so as to fit downward between the upwardly extending receiving clip 22 and the front 62 of the vertical tube 22; two guide members 64, attached to and extending horizontally from the vertical mounting plate 58, which are laterally separated from each other by a space slightly greater than the width of the vertical member 22, so that with the vertical mounting plate 58 inserted into the receiving clip 26 space 60, the guide members 64 embrace the sides 66 of the vertical member 22, so as to limit lateral movement and rotation of the hanging component 16; and a lower support member 68, horizontally positioned below the engagement of the vertical mounting plate 58 and the receiving clip 26, and formed to contact the front 62 of the vertical member 22 and thus provide support against the levered weight of the hanging component 16 and an load thereon.

One form of such mounting means 18 is illustrated, separate from any specific hanging component 16, in FIGS. 5, 6, and 7. The actual shape of the vertical mounting plate 58 and the framework 70 supporting the lower support member 68 may vary in their application to different shaped hanging components 16. Guide members 64 which are 5/16-inch wide by 154-inch wide and 154-inch deep, oriented vertically, have been found to work well. The two guide members 64, when used with a 1½-inch wide vertical member 22, preferably are horizontally separated by approximately 1 9/16-inches.

Various hanging components 16, utilizing the mounting means 18 above described, have been designed for specific uses in conjunction with the modular tack room 10.

Illustrated in FIGS. 8, 9, and 10 is a saddle rack 72 upon which a saddle 74 (see FIG. 1) may be placed for storage. The saddle rack 72 extends horizontally outwards from the mounting means 18, having three extending members 76 of approximately 22-inches in length, connected with an end piece 78, to form a slightly tapering supporting framework 80 of generally triangular cross section upon which a saddle 74 may rest.

Figure 12:
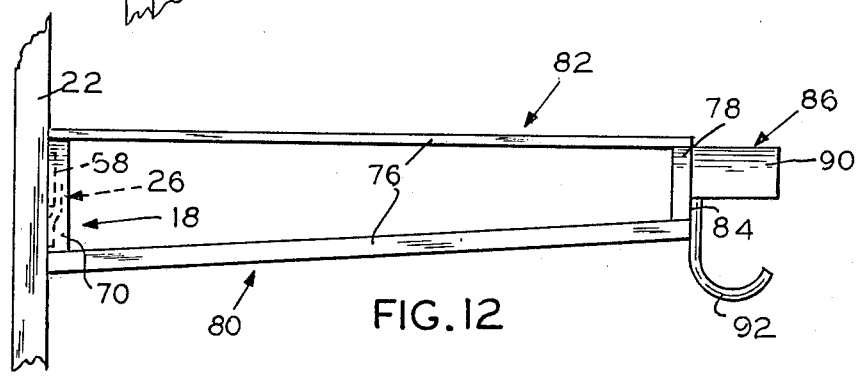
FIG. 12 illustrates a side view of the saddle rack with bridle-harness hanger of FIG. 11.
Figure 13:
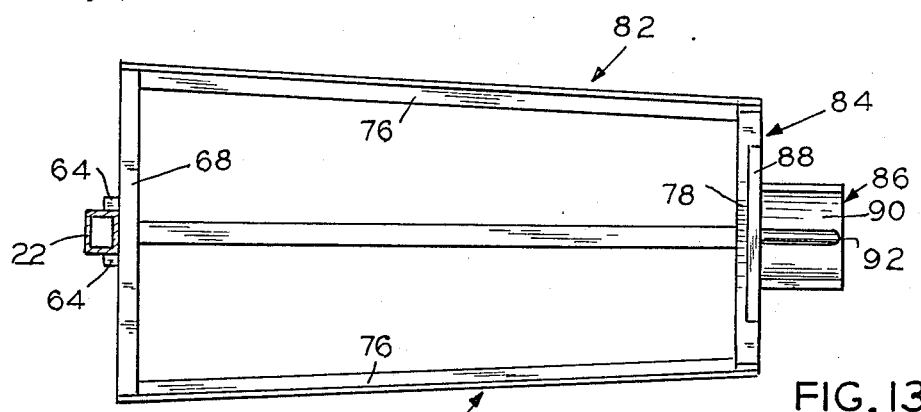
FIG. 13 illustrates a bottom view of the saddle rack with bridle-harness hanger of FIG. 11.
Figure 14:
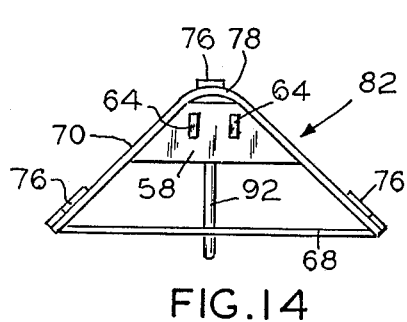
FIG. 14 illustrates an inner end view of the saddle rack with bridle-harness hanger of FIG. 11.
Figure 15:
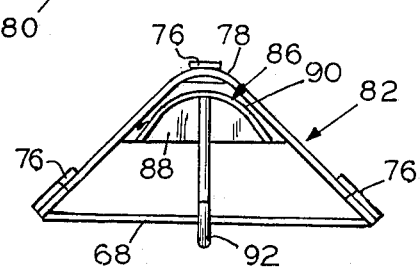
FIG. 15 illustrates an outer end view of the saddle rack with bridle-harness hanger of FIG. 11.

An alternative configuration 82 of the saddle rack 72 additionally includes, at its outer end 84, a bridle-harness hanger 86. The bridle-harness hanger 86 is attached to a vertical hanger plate 88 which, in turn, is attached to the outer end piece 78 of the framework 80, and includes a concavely downward curved plate 90 above and covering an upwardly pointed hook member 92, so that bridle or harness gear (not shown) may be laid over the curved plate 90 or within the hook member 92 for storage. The saddle rack 72 with bridle-harness hanger 86 is illustrated as 82 at FIGS. 11 through 15.

An arm member 94 which projects outwards from the mounting means 18 is shown at FIGS. 16 and 17. While such arm member 94 may be used by itself to hang gear, it is preferably used in conjunction with a second arm member 94 attached to a second, spaced, wall hanger assembly 14, as seen in FIG. 19, so as to support a shelf 96 placed across the two arm members 94. Preferably, in order to preclude the shelf 96 from sliding outwards, off the end 98 of the arm member 94, an upwardly extending lip 100 of approximately 174-inch in height is formed at the outer end 98 of the arm member 94. Such a supported shelf 96 may be used for storing grooming equipment and other items. A preferred outward length of such arm member 94 is approximately 12-inches, with the arm member 94 formed of 1½-inch by ¾-inch square steel tubing.

As seen in FIGS. 23 through 25, an alternative, extended arm member 102 also attaches to the wall hanger assembly 14 by the mounting means 18 but extends outwardly approximately 35 inches to accommodate, in conjunction with a second extended arm member 102 attached to a second, spaced, wall hanger assembly 14, shelving 104 of greater total width. Such wider shelving 104 may be conveniently formed of three 11½-inch boards 106. The extended arm members 102 with shelving 104 thus will accommodate more gear, and also are adaptable as a platform which may serve as an 'off-the-ground' bed or bunk for a person tending the horses. The extended arm member 102 additionally has attached, at its outer end 108, an inwardly and downwardly directed member 110 which engages a diagonal brace member 112. The diagonal brace member 112 preferably has notched ends 114, one of which will embrace the outer end 108 of the extended arm member 102, so as to provide lateral stability to the brace member 112 so that it will not fall from its engagement therewith. The other notched end 114 of the diagonal brace member 112 engages into the next lower receiving clip 26 below, thereby providing additional bracing for a heavier levered load on the extended arm member 102. The diagonal brace member 112 may be made of 174 by 2-inch wide steel, with the notches 116 having a width of 1 9/16 inches so as to securely engage with the preferred 1½-inch width of the receiving clip 26 and the extended arm member 102.

Viewing FIGS. 18 and 19, it is seen that an arm member 94 can be further modified by adding, at its outer end 98, a member 118 having a horizontal aperture 120, through which a horizontal rod 122 may be inserted. Thus, by using two spaced wall hanger assemblies 14 and arm members 94 with the horizontal aperture 120, a rod 122 may be supported which is useful in hanging saddle blankets 124 see FIG. 22) and personal clothing. Preferably, the horizontal aperture 120 is mounted on a vertical plate 126 extending several inches below the outer end 98 of the arm member 94, so as to provide clearance between the rod 122 and a shelf 96 placed on top of the arm members 94. An 11/16-inch diameter aperture 120 may be formed to receive a ⅝-inch diameter steel rod 122. A five-foot long steel rod 122 is preferred for ease of handling and storage. While the aperture member 118 for rod support is illustrated in FIG. 19 with the shorter arm member 94, it also is applicable to the longer, extended arm member 102.

Illustrated at FIGS. 20 through 22, is a multiple saddle blanket arm 128 which includes a bar 130 which extends outwardly and downwardly from the mounting means 18 and which has a number of spaced apertures 132 formed therein. When used in conjunction with a second multiple saddle blanket arm 128 attached to a second, spaced, wall hanger assembly 14, where horizontal rods 122 have been inserted in corresponding apertures 132 between the two multiple saddle blanket arms 128, there is formed a saddle blanket holder 134 capable of supporting, for drying and storage, multiple saddle blankets 124. A preferred configuration, as illustrated, utilizes a bar 130 of approximately 15-inches in length, at a downward angle of about 30 to 35-degrees from the horizontal, with four 11/16-inch diameter apertures 132 centered approximately 3½-inches apart. The preferred steel rods 122 are again five-feet in length. Such arrangement provides adequate spacing for drying and ventilation of multiple saddle blankets 124.

Finally, illustrated at FIGS. 26 through 28 is a bucket holder 136 which includes a horizontal circular rim member 138 which may be attached to a short horizontal extension 140, about four-inches in length from the mounting means 18. The bucket holder 136, preferably approximately 12-inches in diameter, is used to hold a conventional tapered bucket 142 for water or grain for the animals. Such bucket holder 136, with bucket 142, normally would be attached to a wall hanger assembly 14 at a lower receiving clip 26, as seen in FIG. 1.

It is thought that the modular tack room of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiment thereof.

I claim:

1. A modular tack room, comprising:
   a. a wall hanger assembly which includes:
      (1) an elongated vertical member having a top and bottom, and a front, a back and two sides;
      (2) a plurality of receiving clip members attached to the vertical member at its front and extending upwards in a substantially parallel relationship to the vertical member, the plurality of receiving clip members being spaced along the length of the vertical member;
      (3) a horizontal member attached to the top, and extending to the front, of the vertical member and, said horizontal member having connecting means formed therein; and
      (4) a L-shaped member, having on a horizontal, first leg, connecting means formed for adjustable connection with the connecting means of said horizontal member atop the vertical member, and being formed so that when said connecting means are joined, a vertical, second leg of the L-shaped member will extend downwards a spaced distance from the back of the vertical member, an available adjustment of said adjustable connection being the amount of said spaced distance between the second leg of the L-shaped member and the back of the vertical member;
      (5) wherein a clamp-type arrangement is formed between the L-shaped member and the back of the vertical member so as to grip the upper portion of a wall and allow the elongated vertical member with receiving clips to hang therefrom;
   b. at least one hanging component, with an inner end and an outer end, having means of mounting said inner end to the front of the vertical member, which include:
      (1) a vertical mounting plate of thickness less than the space between the receiving clip member and the front of the vertical member, so as to fit downward between the upwardly extending receiving clip member and the front of the vertical member;
      (2) two guide members, attached to and extending horizontally from the vertical mounting plate, which are laterally separated from each other by a space slightly greater than the width of the vertical member, so that with the vertical mounting plate inserted into the receiving clip space, the guide members embrace the sides of the vertical member, so as to limit lateral movement and rotation of the hanging component; and
      (3) a lower support member, positioned below the engagement of the mounting plate and the receiving clip and formed to contact the front of the vertical member and thus provide support against the levered weight of the hanging component any load thereon.

2. The modular tack room, as recited in claim 1, wherein a hanging component includes a saddle rack, extending horizontally outwards from the mounting means, having at least three extending members to form a supporting framework of generally obtuse-angled triangular cross section upon which a saddle may be placed for storage.

3. The modular tack room, as recited in claim 2, wherein the saddle rack additionally has, at its outer end, a bridle-harness hanger which includes a concavely downward curved plate covering an upwardly-pointed hook member, formed so that harness or bridle gear may be laid over the curved plate or within the hook member for storage.

4. The modular tack room, as recited in claim 1, wherein a hanging component includes an arm member, projecting horizontally outwards from the mounting means, which when used in conjunction with a second arm member attached to a second, spaced, wall hanger assembly, provides support for a shelf extending therebetween.

5. The modular tack room, as recited in claim 4, wherein the arm member has, at its outer end, an upwardly extending tip formed to preclude outward sliding of the shelf.

6. The modular tack room, as recited in claim 4, wherein the arm member has an outwardly extending length of approximately 12-inches, so as to accommodate a shelf usable for storing grooming equipment and other items.

7. The modular tack room, as recited in claim 4, wherein the arm member has an outwardly extending length of approximately 35-inches to accommodate a wider shelf, so as to provide, in conjunction with a second arm member of the same length attached to a second, spaced, wall hanger assembly, a wider platform which may be used as a bed.

8. The modular tack room, as recited in claim 4, wherein, additionally, there is a brace member which is formed to engage the arm member proximate its outer end, and to extend diagonally downwards to engage a lower receiving clip, so as to provide additional bracing for the levered load on the bar member.

9. The modular tack room, as recited in claim 4, wherein additionally the arm member has, formed proximate to its outer end, a horizontal aperture through which a rod may be inserted, so that, using two spaced wall hanger assemblies having said arm member with horizontal aperture, the inserted horizontal rod may be used to hang a saddle blanket or personal clothing.

10. The modular tack room, as recited in claim 1, wherein a hanging component includes a multiple saddle blanket arm which comprises a bar which extends outwardly and downwardly from the mounting means and which has a number of spaced apertures formed therein, so that when used in conjunction with a second multiple saddle blanket arm attached to a second, spaced, wall hanger assembly, where horizontal rods have been inserted in corresponding apertures between the two multiple saddle blanket arms, there is formed a saddle blanket holder capable of supporting, for drying and storage, multiple saddle blankets.

11. The modular tack room, as recited in claim 1, wherein a hanging component includes a bucket holder, extending outward from the mounting means, having a horizontal circular member which is formed to support a conventional bucket for water or grain.

* * * * *